(12) United States Patent
Price (10) Patent No.: US 7,168,522 B1
(45) Date of Patent: Jan. 30, 2007

(54) SELF-ERECTING CRANE FOR TREE-MOUNTED BLINDS

(75) Inventor: Terry L. Price, Sheridan, MI (US)

(73) Assignee: High House Blinds, LLC, Sheridan, MI (US)

( * ) Notice: Subject to any disclaimer, the term of this patent is extended or adjusted under 35 U.S.C. 154(b) by 469 days.

(21) Appl. No.: 10/703,726

(22) Filed: Nov. 7, 2003

(51) Int. Cl.
*E04G 3/32* (2006.01)
*E04G 3/00* (2006.01)
*E04G 1/00* (2006.01)

(52) U.S. Cl. .................. 182/141; 182/187; 182/20; 135/901

(58) Field of Classification Search ............ 182/20, 182/116, 187, 188, 135, 136, 141, 142; 135/900, 135/901
See application file for complete search history.

(56) References Cited

U.S. PATENT DOCUMENTS

| | | | |
|---|---|---|---|
| 3,568,796 A * | 3/1971 | Stanhope ................. 182/141 |
| 3,568,797 A * | 3/1971 | Hardy ..................... 182/142 |
| 4,082,161 A * | 4/1978 | Johnson ................... 182/187 |
| 4,134,474 A * | 1/1979 | Stavenau et al. .......... 182/187 |
| 4,493,395 A | 1/1985 | Rittenhouse |
| 4,582,165 A | 4/1986 | Latini |
| 4,593,789 A * | 6/1986 | Treants .................... 182/142 |
| 5,117,942 A * | 6/1992 | Tzavaras .................. 182/142 |
| 5,803,694 A * | 9/1998 | Steele ..................... 135/901 |
| 5,862,827 A * | 1/1999 | Howze ..................... 135/900 |
| 5,908,084 A * | 6/1999 | Laurin et al. ............ 182/142 |

\* cited by examiner

*Primary Examiner*—Hugh B. Thompson, II
(74) *Attorney, Agent, or Firm*—Northern Michigan Patent Law, PLC (57) ABSTRACT

A crane mechanism for raising a hunting blind or similar large object up along the side of a tree trunk, the crane using the vertical tree trunk as its support tower. The crane is generally L-shaped in use, having a vertical trunk-securing arm adapted to be temporarily secured directly against the side of the tree trunk above the installation height of the object to be raised, a perpendicular boom extending away from the tree trunk, and a hoist mechanism on the boom spaced from the tree trunk. A separable hoist drive can be used, for example mounted to the base of the tree trunk in the same manner as the vertical trunk-securing arm.

11 Claims, 9 Drawing Sheets

SELF-ERECTING CRANE FOR TREE-MOUNTED BLINDS

FIELD OF THE INVENTION

The present invention is in the field of tree-mounted hunting platforms of the type used by deer hunters, and more particularly devices used to lift such platforms to a desired installation height in a tree.

BACKGROUND OF THE INVENTION

This application is co-pending with commonly-owned applications by the same inventor disclosing a walled, blind-style hunting enclosure removably mounted to the side of a tree in cantilever fashion. The blind is fully walled and in a preferred version is also roofed, yet is lightweight, easy to put up, and easy to take down. The blind and its cantilever supports are designed to be assembled at the base of the tree to which it is to be mounted, and hauled vertically up and down the side of the tree trunk to be placed and secured in the desired hunting position.

The cantilever support is adapted to be fastened to the side of the tree trunk at a desired hunting height. The cantilever support of the tree-mounted blind is a generally L-shaped structure with multiple anchor blocks spaced vertically along a rigid trunk-securing arm, and with the blind supported on a horizontal cantilever arm. The anchor blocks secure the vertical trunk-securing arm generally parallel to the tree trunk, such that the blind is also generally parallel to the tree trunk at that point.

Such blinds are capable of being assembled at the base of a tree, but once assembled must be lifted to the desired hunting height. Although the blinds are made to be man-portable in sections to a blind site, once assembled they are much larger and heavier than typical treestand platforms. Raising such a blind to the desired hunting height, and holding it in position against the side of the tree trunk while the cantilever support is secured to the trunk, requires some sort of hoist or lift mechanism.

SUMMARY OF THE INVENTION

The present invention is a lift mechanism for the above-described blinds in the form of a crane that can be conveniently secured to the side of the tree trunk, above the desired blind location, in essentially the same manner as the blind itself. The crane includes a cantilever support with a generally L-shaped structure having multiple anchor blocks spaced vertically along a rigid trunk-securing arm, and a cantilever arm extending laterally away from the tree as a boom to support a hoist mechanism. The anchor blocks secure the vertical trunk-securing arm generally parallel to the tree trunk, such that the boom is generally perpendicular to the tree trunk.

In a preferred form the boom is foldable against the trunk-securing arm for storage and transport. In a further preferred form the hoist mechanism is adjustable along the boom so that its distance from the tree trunk can be varied.

A hoist drive can be mounted on or to any stable surface or support on or near the tree, acting through the mechanism on the boom to lift a blind. In a preferred form, the hoist drive is secured to a tree-engaging anchor block similar to the anchor blocks on the crane, so that the hoist can be attached directly to the side of the tree trunk.

In yet a further form, the crane serves as a self-towable trailer that can also carry blind components or other gear.

One or more wheels is mounted on the trunk-securing arm, and the boom is capable of being rotated to act as a pull-handle. In a further form, the pull-handle is attached to a wearable harness.

These and other features and advantages of the invention will become apparent upon further reading of the specification in light of the accompanying drawings.

DETAILED DESCRIPTION OF THE INVENTION

Figure 1:
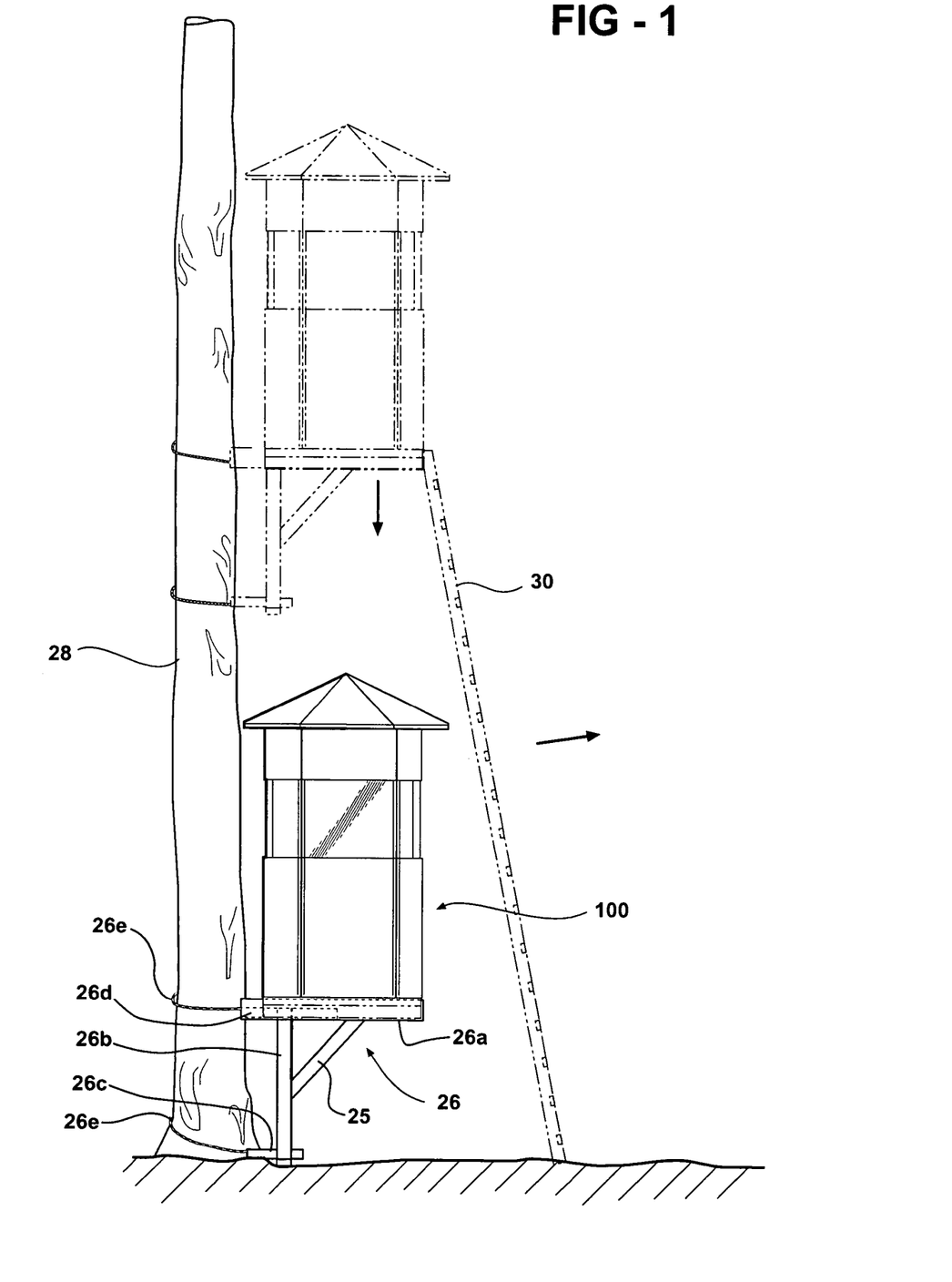
FIG. 1 is a side elevation view of a tree-mounted blind shown attached to the base of the tree trunk (solid lines) and raised to a desired hunting height (broken lines) on the tree trunk.
Figure 1A:
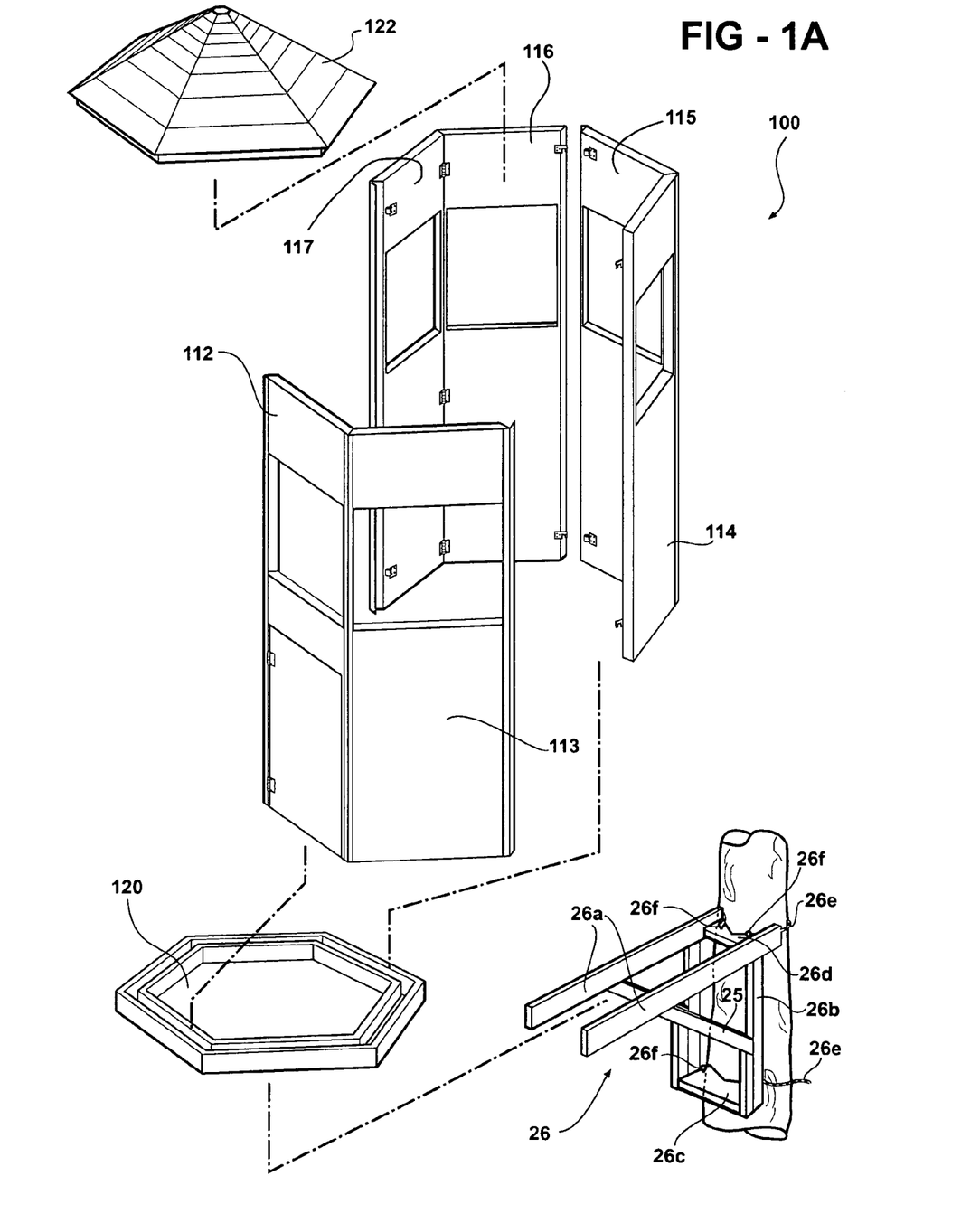
FIG. 1A is a perspective, exploded view of the assembly sections of the blind of FIG. 1 relative to a cantilever mount secured to the base of the tree trunk.
Figure 2:
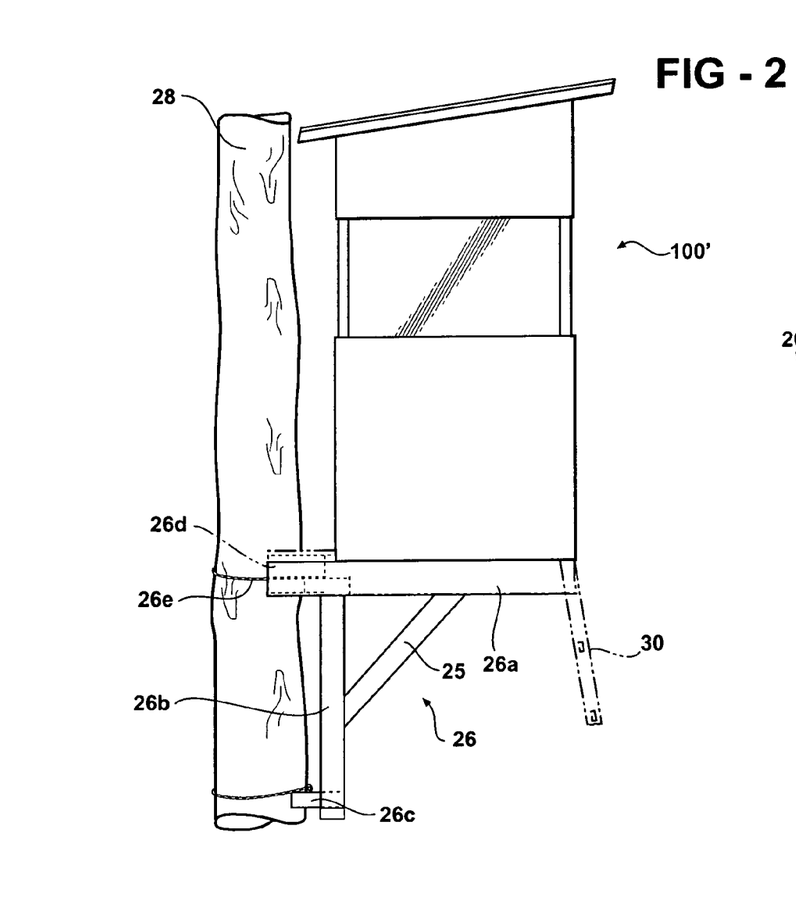
FIG. 2 is a side elevation view of a different blind on the cantilever mount of FIG. 1.
Figure 3:
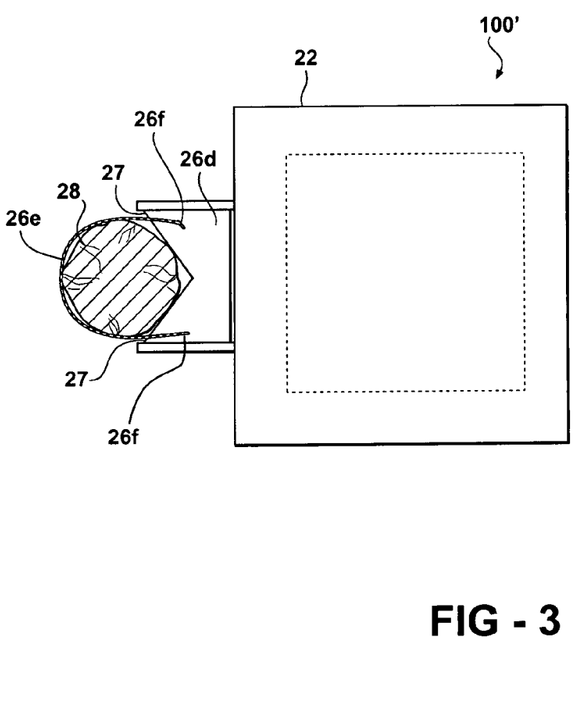
FIG. 3 is a top plan view of the blind and mount of FIG. 2, with the tree trunk sectioned for clarity.

Referring to FIGS. 1 through 3, exemplary tree-mounted blinds 100 and 100' are shown mounted in cantilever fashion to the side of a tree trunk 28, supported on a generally L-shaped cantilever mount 26 so as to have a rear wall essentially squarely mounted next to the tree trunk. The floor of each blind rests on and is secured to horizontal cantilever arm portion 26a (in the illustrated embodiment comprising a pair of spaced, parallel wooden rails). Vertical support portion 26b is likewise made from wood members and removably secured against the side of tree trunk 28 via lower and upper anchor blocks 26c and 26d tensioned laterally against the tree trunk with suitably strong cables, chains, or straps 26e. Triangular bracing 25 is added to the L-shaped cantilever support for strength.

Blinds 100 and 100' are accordingly supported in cantilever fashion directly adjacent the vertical tree trunk, essentially paralleling the trunk. It will be understood that the terms "horizontal", "vertical", and "parallel" used above in reference to the cantilever support, the blind, and the tree are used in a general and relative sense with respect to the tree and ground, since no tree is perfectly straight and vertical, and since the position of a given blind and its support will vary somewhat from one installation to another on different trees.

As best shown in FIGS. 1A and 3, the cantilever support's anchor blocks 26c and 26d have wide, V-shaped tree-engaging faces 27 for a cradled, self-centering wedge fit against the trunk. In the illustrated embodiment, the anchor blocks are made from wood, providing non-damaging surfaces against the bark of the tree. In the illustrated embodiment the blocks are each made from stacks of several flat boards, for example particle board and/or sawn lumber, stacked and locked together into a block with framing members and nails, screws, clamping members and/or strong adhesive. Eyebolts 26f are secured deeply into the anchor blocks, with hooks or eyes on their protruding ends to receive the ends of chains, cables or straps that can be tensioned around the tree.

In the illustrated example, upper and lower anchor blocks 26c and 26d are identical. The wide and relatively shallow nature of the V-shaped anchor block faces 27, and their rigid vertical spacing on the trunk in a two-point tensioned connection, securely centers and locks the cantilevered mounting structure 26 (and the blind) both vertically and laterally to the side of the tree. It will be understood that the angle and relative size of the V-shaped tree-engaging faces of the blocks could differ from that shown. The upper and lower blocks can also differ from one another, although identical blocks have been found sufficient.

The hexagonal blind 100 of FIGS. 1 and 1A and the rectangular blind 100' of FIGS. 2 and 3 are only two of many possible shapes that can be used for the enclosed blind structure, including but not limited to squares, octagons, and even cylinders. It is preferred, however, that the shape chosen have a flat rear wall facing the tree and a flat front wall for a door and ladder opposite the cantilever support on the tree trunk.

The enclosed, tree-paralleling shape of the blind and its cantilever mount to the side of the tree allow the blind to be assembled and installed on the tree in a unique and convenient manner. The blind's walls, floor, and roof portions are preferably constructed as separate modules or sections that are easily transported and that can be quickly assembled using ordinary hand or power tools at the base of a tree, for example by bolting or screwing the sections together. The cantilever support structure 26 is formed as a separate, stand-alone module that is easily transported to the tree, fastened to the base of the tree with its chains as shown in solid lines, and then used as an off-the-ground platform at a convenient height to assemble and secure the blind to the support structure.

The hexagonal blind 100 shown in FIGS. 1 and 1A lends itself particularly well to a convenient modular assembly that is easy to transport to and from the blind site. As shown in FIG. 1A, the flat rectangular walls 112–117 are formed in three hinged sections that fold flat for transport and that open up into freestanding sections to be positioned on and secured to floor 120. Floor 120 can be formed with two symmetrical folding halves, hinged along the centerline of the base to fold flat. The upper side of floor 120 has a wall-receiving channel defined about its periphery by raised wooden frame members. The wall sections are simply dropped into place into the channel and secured to one another and/or the floor, ready to receive roof 122. Roof 122 has roof anchor cleats on its inner surface aligned to form a hexagon sized to fit inside the hexagonal walls and be secured thereto with removable fasteners.

FIG. 1 shows the fully assembled blind 100 and support 26 raised as a unit up the side of the tree trunk, to the desired hunting position shown in broken lines. The V-shaped tree-engaging faces on the anchor blocks of support 26 serve as guides to help the blind track along the side of the tree trunk and prevent undue rotation or twisting as the combined blind and support are raised into position. Once in position, the tensioning means 26e secured to the blocks are simply tightened once again around the tree trunk to lock the blind in its final hunting position. A ladder 30 can then be placed at the door of the blind.

Figure 4:
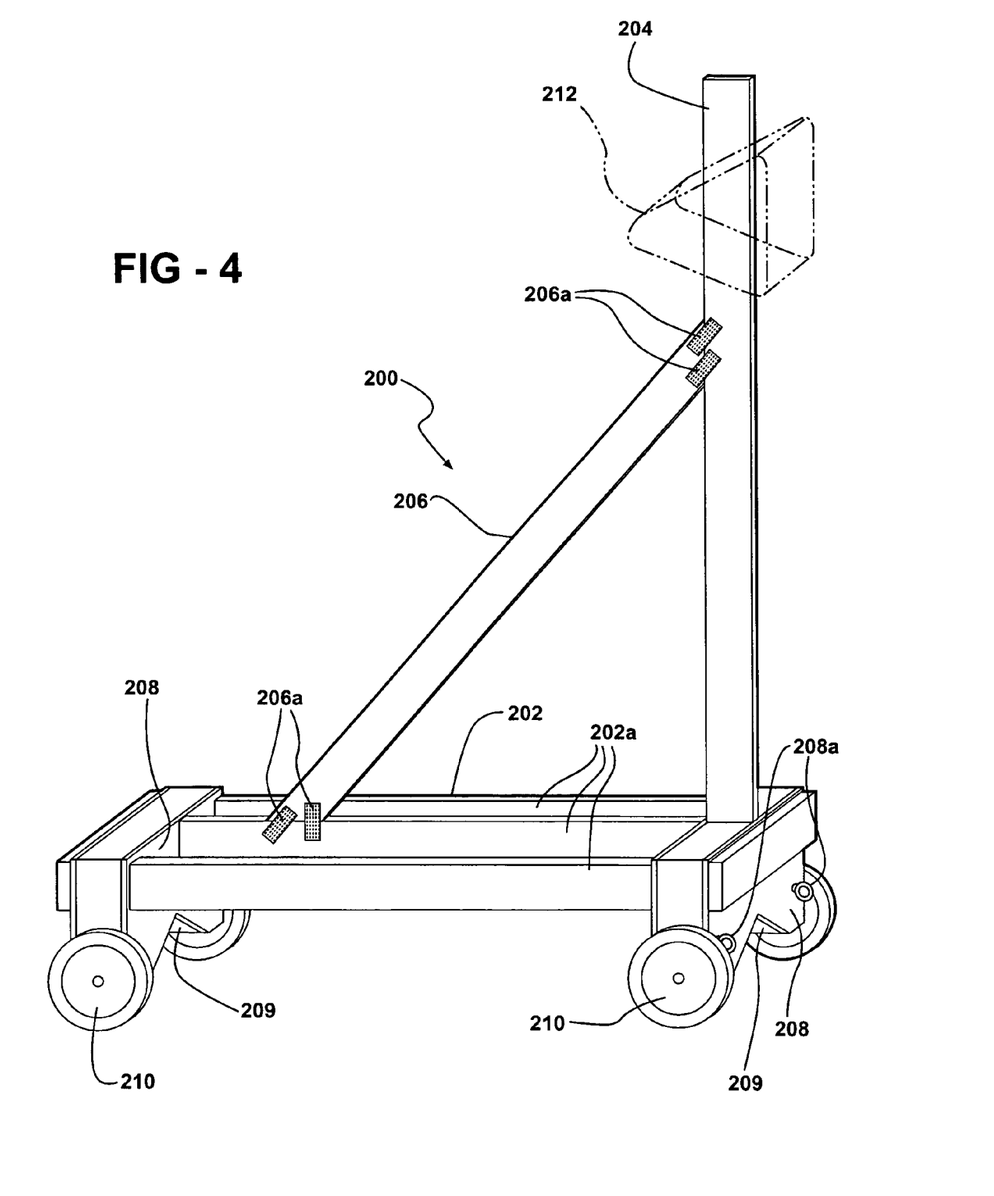
FIG. 4 is a perspective view of a first embodiment of a crane according to the invention for raising and lowering blinds such as those shown in FIGS. 1 and 2 up and down the trunk of a tree.

Referring next to FIG. 4, a first embodiment of a crane according to the invention is shown at 200, made primarily from wood framing members. Crane 200 is patterned on the cantilever mount 26 of FIGS. 1 through 3, having a trunk-securing platform 202, a lateral boom 204, a boom brace 206, and V-faced anchor blocks 208 at the ends of platform 202. FIG. 4 shows crane 200 in its transport-trailer configuration, in which wheels 210 are mounted on the anchor blocks to allow the crane to be towed to the blind site.

Boom 204 is supplied with a hoist mechanism, such as the removable pulley block illustrated in broken lines at 212. Whatever the specific mechanism used, it can be either removably or permanently mounted on boom 204, and its position is preferably adjustable along the length of boom 204.

Anchor blocks 208 are of essentially the same construction as those described above in reference to the cantilever mount 26 of FIGS. 1 through 3, with eyebolts 208a for attaching tensioning means such as cables, chains, or straps to clamp their V-faces 209 against the side of a tree trunk, thereby securing the entire crane 200 both vertically and laterally to the trunk. Wheels 210 are positioned to be clear of the connection between anchor blocks 208 and the tree trunk, so that the wheels can be left on the crane when the crane is secured to the tree.

In the illustrated example of FIG. 4, trunk-securing platform 202 is formed from three spaced longitudinal framing members 202a, for example two-by-fours, forming a wide, flat, stable platform capable of carrying gear, blind sections, and even game to and from the blind site. Diagonal boom brace 206 is shown permanently attached with brackets 206a, but may be provided with a removable connection to platform 202 and boom 204 to make more room on the platform for towed gear. Even in its upright position, however, boom 204 and brace 206 can provide a convenient lashing point and support for large blind components and other gear.

Because boom 202 needs only to provide a suitably strong support for the hoist mechanism to temporarily support the lift weight of a blind, and not a long-term floor support for the blind itself, illustrated boom 202 is a single rigid beam member, again for example a two-by-four, centered one end of platform 202.

Figure 5:
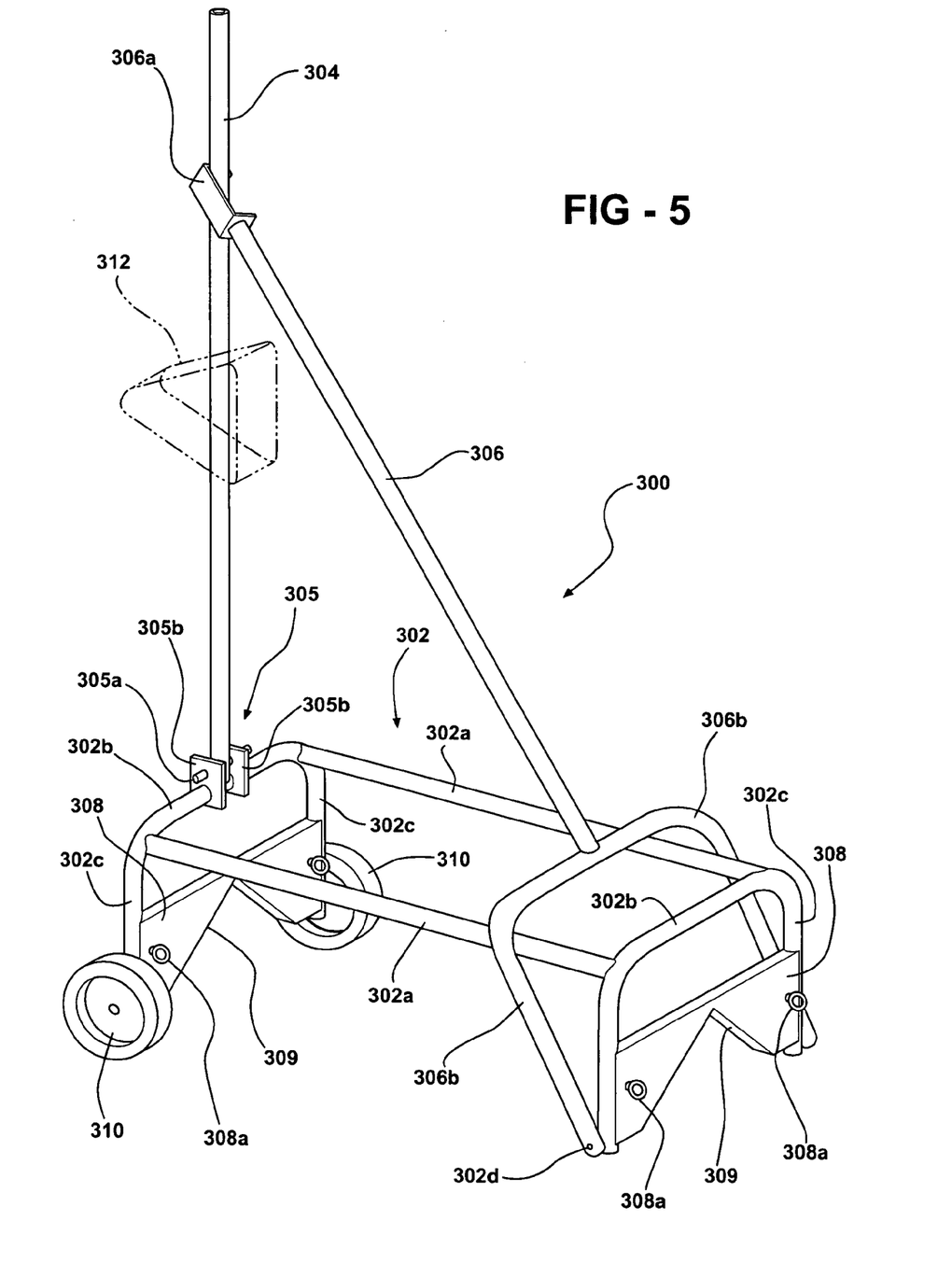
FIG. 5 is a perspective view of a second embodiment of a crane according to the invention.

Referring next to FIG. 5, an alternate embodiment of a crane is illustrated generally at reference numeral 300, made primarily from metal pipe such as steel or aluminum, rather than wood. Crane 300 has a trunk-securing platform 302, a boom 304, a boom brace 306, and V-faced anchor blocks 308 at the ends of platform 302. A single set of wheels 310 is located at one end, and a hoist mechanism 312 is removably mounted on boom 304. Anchor blocks 308 are formed from metal plate secured by welding them in place between yoke-like end arms 302c on platform 302.

Boom 304 is rotatably mounted on the crossmember 302b at one end of the trunk-securing platform, for example on a pivot pin 305a secured between two mounting plates 305b welded to the crossmember. Boom brace 306 is rotatably connected to the other end of platform 302, for example with spaced yoke arms 306b connected to pivot pins 302d protruding from the ends of spaced platform arms 302c. The free end of boom brace 306 includes a latch or catch member 306a capable of being connected to boom 304 to hold the boom rigidly in place in its laterally extended position, as shown in FIG. 5, with sufficient strength to withstand the load of a blind.

Figure 6:
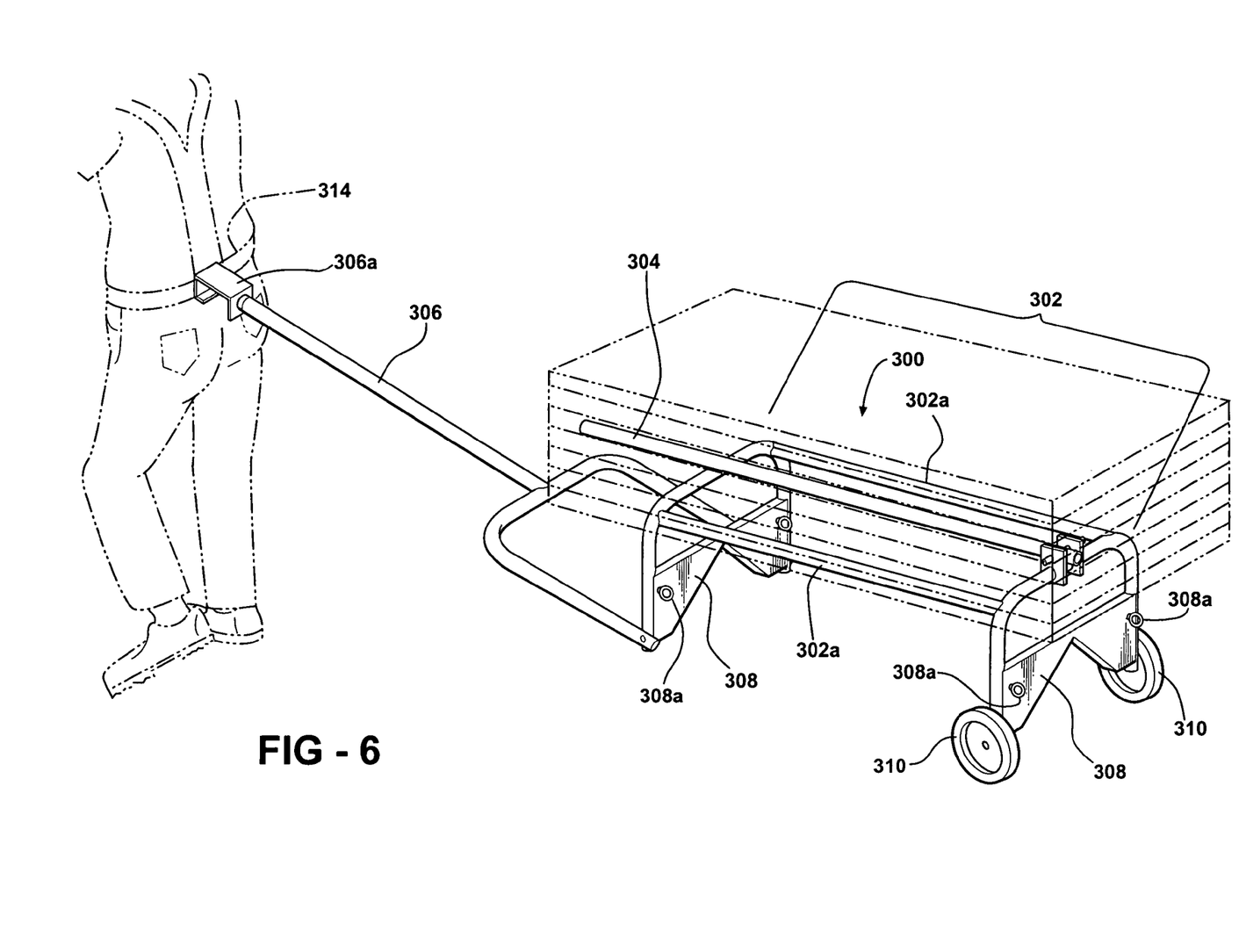
FIG. 6 is a rear perspective view of the crane of FIG. 5, adjusted for transport and use as a trailer.

Referring to FIG. 6, boom 304 is meant to fold flat on platform 302 for transport, while boom brace 306 is rotated forward to provide a pull handle or tow bar for the wheeled crane. In the illustrated embodiment, the boom catch member 306a also serves as a convenient handle grip, and/or as a hook to be connected to a belt- or backpack-style harness 314 worn by the hunter towing the crane to a blind location. Platform longitudinal members 302a and folded boom 304 provide a reasonably flat platform on which blind components, hunting gear, tools, and even game can be secured and towed. Folding boom 304 can even be folded down on top of a load carried by platform 302, and lashed down to better secure the load.

Figure 7:
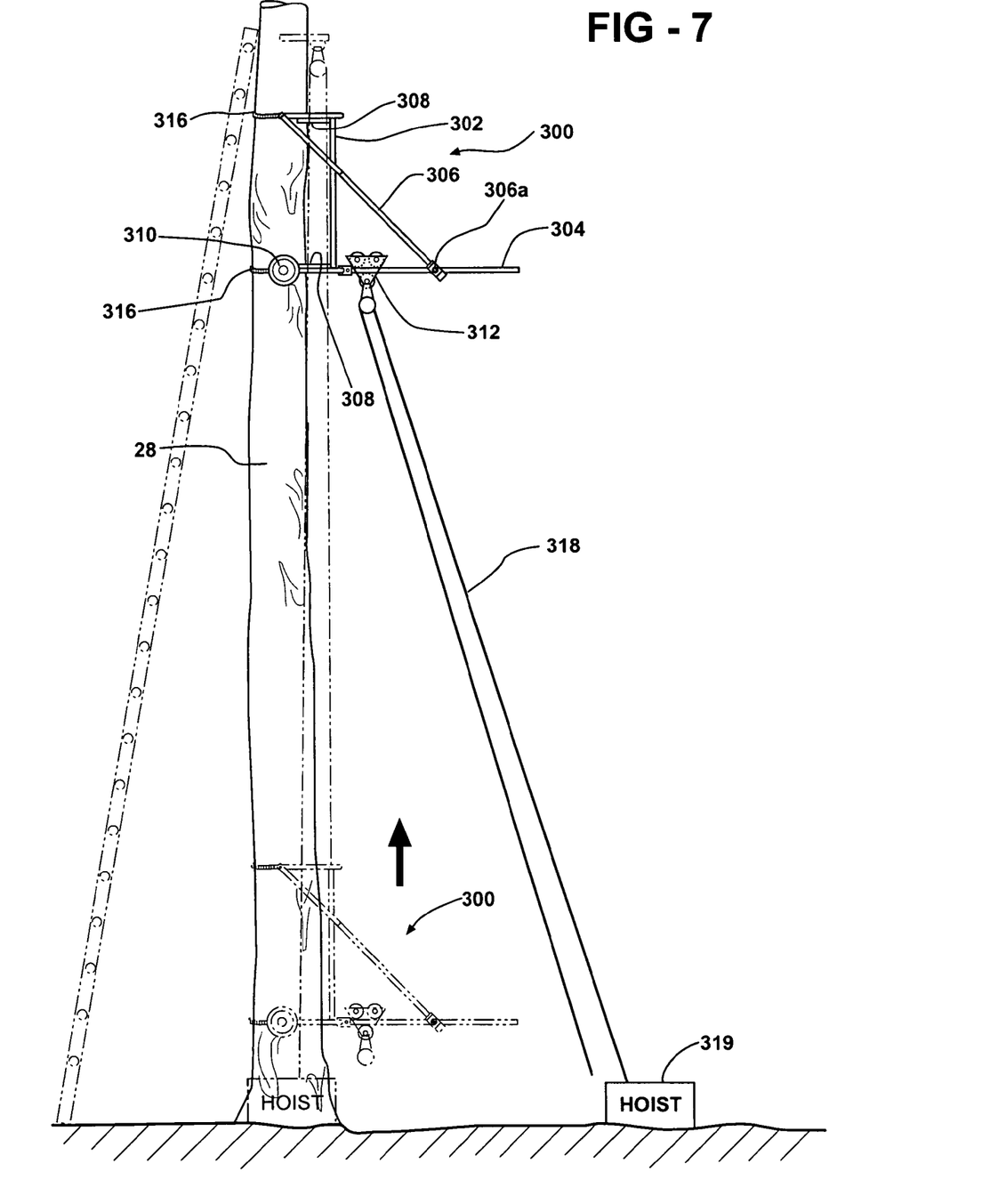
FIG. 7 is a side elevation view of the crane of FIG. 5, attached to the base of a tree trunk (broken lines) and raised to an installation position on the tree trunk (solid lines) above the desired hunting height.

Referring next to FIG. 7, crane 300 is towed to the base of the tree where the blind is to be installed and temporarily supported against the tree. The hoist mechanism 312 is installed on boom 304. An extension ladder is then used to fasten a temporary pulley (shown in phantom) to the tree above the location where the crane 300 is to be secured to the tree. Hoist drive 319 is anchored to the ground, a vehicle, or the tree trunk and cable 318 (phantom) is run through this temporary pulley and down to the top of crane 300. Hoist drive 319 is then used to lift the crane 300 into position for anchoring to the tree in the installation position above the desired hunting height of the blind. Cable 318 is removed from the temporary pulley and placed through the pulley on hoist mechanism 312 for use in hoisting the blind to the desired hunting height. After the blind is erected and secured to the tree, cable 318 is unhooked from the blind and hoist mechanism 312, run back through the temporary pulley, and attached to the top of crane 300, which is then unanchored from the tree and lowered to the ground with the hoist drive 319.

Figure 8:
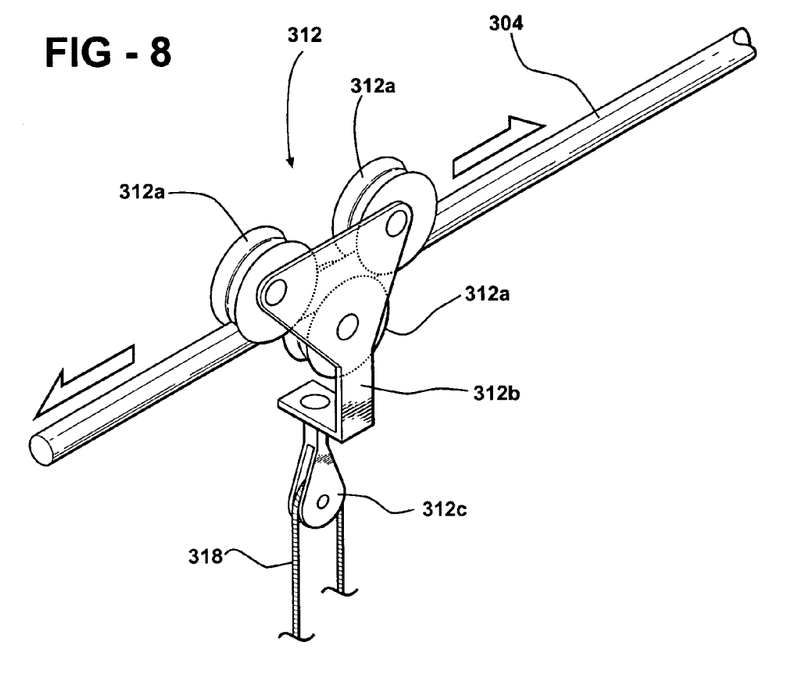
FIG. 8 is a detailed perspective view of a laterally adjustable pulley assembly on the boom of the crane of FIG. 5.

FIG. 8 shows the details of the pulley hoist mechanism 312, which is only one of many possible hoist mechanisms that can be used in known manner to provide a point of lift on boom 304. A triangular arrangement of guide wheels 312a rides on boom 304, joined by a frame plate 312b that also supports a lift pulley 312c. Lift cable or rope 318 is threaded around lift pulley 312c. It will be apparent that lateral adjustment of block 312 on boom 304 can be made through lift cable 318, provided that wheels 312a ride freely enough on the boom track.

Figure 9:
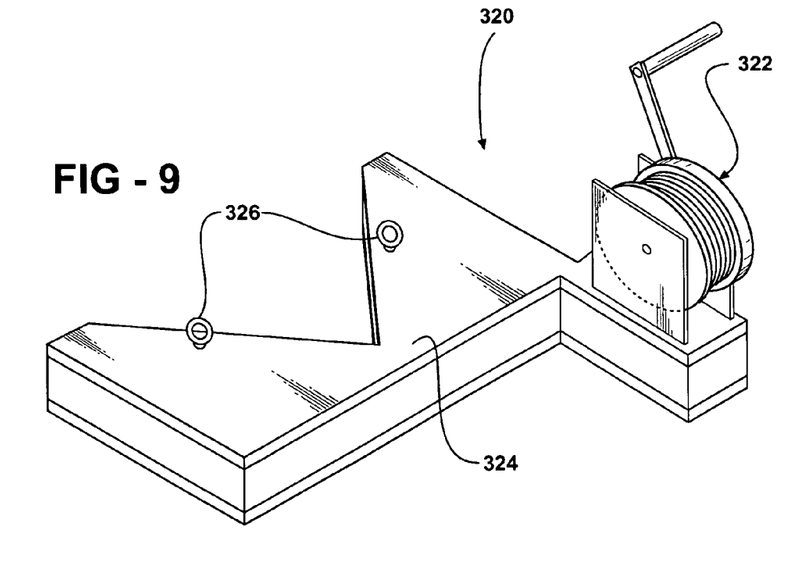
FIG. 9 is a perspective view of a hoist drive anchor according to the invention.

FIG. 9 shows a preferred hoist drive 320 according to the invention, in which a manual crank winch mechanism 322 is secured to an anchor block 324 similar to the wooden anchor blocks shown in FIGS. 1 through 4. Winch 322 is preferable offset to the rear and to one side, for clearance with respect to the tree trunk when winding the handle. The anchor block 324 can be placed at any convenient height on the tree trunk, fastened in place with a chain, cable or strap connected to eyebolts 326 as described above. Once the blind is installed with the crane, hoist drive 320 is easily removed until needed to take the blind down. This tree-tensioned anchor block fastening arrangement is strong enough to withstand the forces generated by the load of a blind on the winch.

Figure 10:
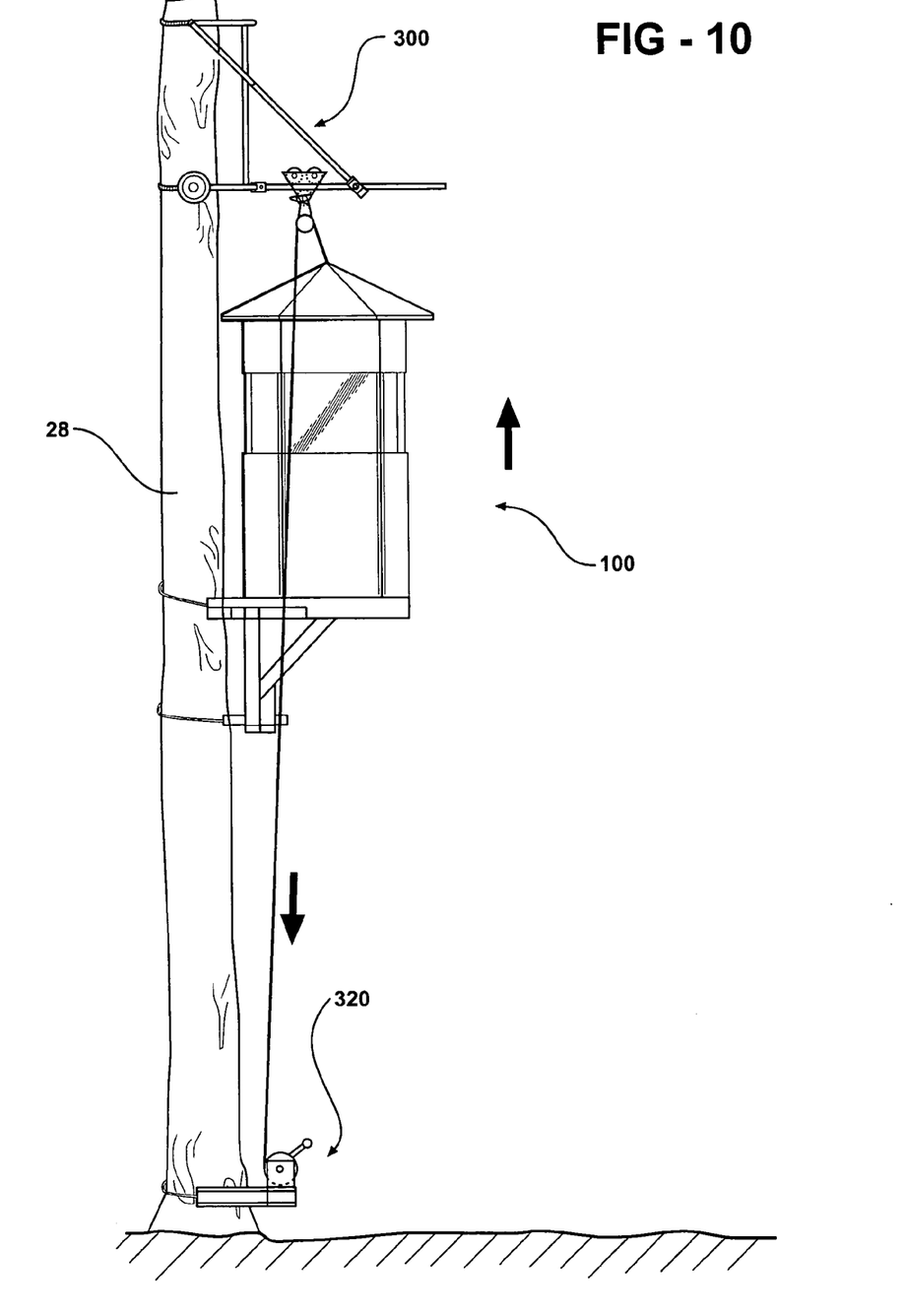
FIG. 10 shows the crane of FIG. 5 being used to lift the blind of FIG. 1 to the desired hunting height on the tree trunk.

Referring lastly to FIG. 10, crane 300 is shown mounted up high on tree trunk 28, with blind 100 raised into its installation position on the tree trunk. A cable running from hoist 320 mounted to the base of the tree trunk operates through the hoist mechanism on crane 300 to lift blind 100 straight up the side of the tree trunk, and then to hold the blind in place while it is fastened to the tree trunk in the manner described above. The free end of the hoist cable can be attached anywhere on the blind or its cantilever support, but in general a connection toward the upper end of the blind, for example to an eyebolt or hook or wrapped around the body of the blind underneath the eave of its roof, is preferred for balance and for tracking the blind up the side of the tree.

It will be understood that the foregoing illustrated examples are but preferred forms of the invention, and that modifications such as to the materials, dimensions, hoist mechanism and drive, and others will be available to those skilled in the art without departing from the scope of the invention as set forth below.

I claim:

1. A crane for raising a hunting blind or similar large object up along the side of a tree trunk, comprising:
   a trunk-securing platform comprising one or more longitudinal members capable of carrying a load to and from an intended blind-raising site when the trunk-securing platform is horizontal, and further comprising two spaced tree trunk attachment points adapted to be temporarily secured directly to the side of a tree trunk in parallel fashion when the trunk-securing platform is vertical;
   a horizontal boom connected to the trunk-securing platform and having an extension position extending laterally away from the trunk-securing platform so as to be perpendicular to a tree trunk when the trunk-securing platform is vertically secured to the side of the tree trunk;
   a hoist mechanism on the boom spaced from the trunk-securing platform so as to be spaced from a tree trunk when the trunk-securing platform is vertically secured to the side of the tree trunk, wherein the trunk-securing platform comprises at least one wheel for towing the crane to and from an intended blind-raising site with the trunk-securing platform horizontal.

2. The crane of claim 1, wherein the crane further comprises a foldable boom brace movable from a boom-bracing position to a towing position.

3. The crane of claim 1, wherein the boom is foldable against the trunk-securing platform to help carry a load.

4. The crane of claim 1, wherein the two spaced attachment points comprise V-faced anchor blocks adapted to be releasably tensioned against the side of the tree.

5. The crane of claim 4, wherein the anchor blocks comprise strap means adapted to fit around a tree trunk for tensioning the anchor blocks laterally against the tree trunk.

6. The crane of claim 1, further comprising a hoist drive separate from the hoist mechanism on the boom, the hoist drive adapted to be secured to the base of a tree trunk and operatively connected to the hoist mechanism on the boom through cable means for lifting a blind to a desired hunting height through the hoist mechanism on the boom.

7. A crane for raising a hunting blind or similar large object up along the side of a tree trunk, comprising:
   a trunk-securing platform comprising one or more longitudinal members capable of carrying a load to and from an intended blind-raising site when the trunk-securing platform is horizontal, and further comprising two spaced tree trunk attachment points adapted to be temporarily secured directly to the side of a tree trunk in parallel fashion when the trunk-securing platform is vertical;

a horizontal boom connected to the trunk-securing platform and having an extension position extending laterally away from the trunk-securing platform so as to be perpendicular to a tree trunk when the trunk-securing platform is vertically secured to the side of the tree trunk;

a hoist mechanism on the boom spaced from the trunk-securing platform so as to be spaced from a tree trunk when the trunk-securing platform is vertically secured to the side of the tree trunk, further comprising a hoist drive separate from the hoist mechanism on the boom, the hoist drive adapted to be secured to the base of a tree trunk and operatively connected to the hoist mechanism on the boom through cable means for lifting a blind to a desired hunting height through the hoist mechanism on the boom.

8. The crane of claim 7, wherein the hoist drive comprises a V-faced anchor block adapted to be temporarily secured directly against the side of the tree trunk.

9. The crane of claim 8, wherein the hoist drive anchor block comprises strap means adapted to fit around a tree trunk for tensioning the anchor blocks laterally against the tree trunk.

10. The crane of claim 7, wherein the crane further comprises a foldable boom brace movable from a boom-bracing position to a towing position.

11. The crane of claim 7, wherein the boom is foldable against the trunk-securing platform to help carry a load.

* * * * *